(12) United States Patent
Pan et al.

(10) Patent No.: US 11,153,545 B2
(45) Date of Patent: Oct. 19, 2021

(54) PROJECTION DEVICE AND ILLUMINATION SYSTEM THEREOF

(71) Applicant: Coretronic Corporation, Hsin-Chu (TW)

(72) Inventors: Haw-Woei Pan, Hsin-Chu (TW); Chih-Hsien Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/848,845

(22) Filed: Apr. 15, 2020

(65) Prior Publication Data
US 2020/0351480 A1 Nov. 5, 2020

(30) Foreign Application Priority Data

Apr. 30, 2019 (CN) .......................... 201920612551.1

(51) Int. Cl.
*G03B 21/20* (2006.01)
*H04N 9/31* (2006.01)
(Continued)

(52) U.S. Cl.
CPC ......... *H04N 9/3197* (2013.01); *G02B 13/002* (2013.01); *G02B 19/0047* (2013.01);
(Continued)

(58) Field of Classification Search
CPC .... G03B 21/006; G03B 21/008; G03B 21/28; G03B 21/145; G03B 21/204; G03B 21/208; G03B 21/2053; G02B 27/0961; G02B 27/0964; G02B 27/1027; G02B 27/1033; G02B 13/0015; G02B 13/002; G02B 13/005; H04N 9/315; H04N 9/3111;
(Continued)

(56) References Cited

U.S. PATENT DOCUMENTS

2008/0204847 A1\* 8/2008 Kamm ................. H04N 9/3129
359/238
2011/0096298 A1\* 4/2011 Huang ............... G03B 21/2033
353/33

(Continued)

FOREIGN PATENT DOCUMENTS

CN 203337988 U 12/2013

*Primary Examiner* — Sultan Chowdhury

(57) ABSTRACT

A projection device includes an illumination system, a light valve, and a projection lens. The illumination system includes a light source, a lens array, a condenser lens, and a wavelength conversion element. The light source is for providing a light beam. The lens array and the condenser lens are disposed on a transmission path of a light beam. The condenser lens is for receiving the light beam passing through the lens array and converting the light beam into a condenser light beam. The wavelength conversion element is for receiving the condenser light beam and converting at least a portion thereof into a converted light beam. The projection device and the illumination system provided by the invention can effectively improve the conversion efficiency of the wavelength conversion element and prevent the wavelength conversion element from damage, and effectively project the converted light beam generated by the wavelength conversion element.

16 Claims, 10 Drawing Sheets

(51) Int. Cl.
  *G02B 19/00* (2006.01)
  *G02B 13/00* (2006.01)
  *G02B 27/09* (2006.01)

(52) U.S. Cl.
  CPC ....... *G02B 27/0961* (2013.01); *G03B 21/204* (2013.01); *G03B 21/208* (2013.01)

(58) Field of Classification Search
  CPC .. H04N 9/3114; H04N 9/3141; H04N 9/3152; H04N 9/3155; H04N 9/3197
  See application file for complete search history.

(56) References Cited

U.S. PATENT DOCUMENTS

| | | | |
|---|---|---|---|
| 2017/0329212 A1* | 11/2017 | Akiyama | G03B 21/204 |
| 2019/0179220 A1* | 6/2019 | Hu | G02B 26/008 |
| 2020/0218058 A1* | 7/2020 | Takahashi | H04N 9/3182 |

* cited by examiner

PROJECTION DEVICE AND ILLUMINATION SYSTEM THEREOF

CROSS-REFERENCE TO RELATED APPLICATION

This application claims the priority benefit of CN201920612551.1, filed on Apr. 30, 2019. The entirety of the above-mentioned patent application is hereby incorporated by reference herein and made a part of this specification.

FIELD OF THE INVENTION

This invention relates to a projection device and an illumination system thereof, and more particularly to a projection device and an illumination system thereof having a lens array.

BACKGROUND OF THE INVENTION

A projection device is a device that projects an image onto a projection screen for presentation to the user. The projection device has an illumination system that generates uniform light to provide the illumination light beam required for projection. The illumination system of a general projection device focuses the light beam generated by the light source on the phosphor layer to generate a fluorescent light beam. In order to achieve uniform output brightness, the illumination system is usually provided with a light integration rod, so that the fluorescent light beam generated by the phosphor layer can be uniformized by the light integration rod to generate a suitable illumination light beam.

However, since the energy density of the light beam incident on the phosphor layer is high, especially the energy density of the light beam is shown as Gaussian distribution, the energy of the light beam is concentrated on the central region of the light beam and generates high thermal energy on the phosphor layer. Even if the light beam is adjusted to be relatively uniformly distributed, the central region of the light beam (incident on the phosphor layer) will also become a high thermal energy region due to the accumulation of surrounding thermal energy. The high thermal energy accompanying generated on the phosphor layer, if not provided with a good heat dissipation mechanism or improvement scheme, is likely to reduce the conversion efficiency of the phosphor layer and cause damage to the phosphor layer. Therefore, how to improve the conversion efficiency of the phosphor layer and avoid damage is the focus of attention of the person skilled in the arts.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a projection device, by which the conversion efficiency of the wavelength conversion element is effectively improved, the wavelength conversion element is prevented from damage, and the converted light beam generated by the wavelength conversion element is effectively projected.

The invention further provides an illumination system, by which the conversion efficiency of the wavelength conversion element is effectively improved, the wavelength conversion element is prevented from damage, and the converted light beam generated by the wavelength conversion element is effectively projected.

Other objectives and advantages of the invention will be further understood from the technical features disclosed in the invention.

In order to achieve one or a part or all of the above or other objectives, an embodiment of the invention provides a projection device, which includes an illumination system, a light valve, and a projection lens. The illumination system includes a light source, a lens array, a condenser lens, and a wavelength conversion element. The light source is for providing a light beam. The lens array is disposed on a transmission path of the light beam. The lens array includes a plurality of lenses. Each of the lenses has a first surface and a second surface opposite to each other. Each of the first surfaces is adjacent to the light source. Each of the first surfaces or each of the second surfaces is an aspherical surface. The condenser lens is disposed on the transmission path of the light beam and for receiving the light beam passing through the lens array and converting the light beam into a condenser light beam. The wavelength conversion element is for receiving the condenser light beam and converting at least a portion of the condenser light beam into a converted light beam. The light valve is disposed on a transmission path of the converted light beam and for converting the converted light beam into an image light beam. The projection lens is disposed on the transmission path of the image light beam.

In order to achieve one or a part or all of the above or other objectives, an embodiment of the invention provides an illumination system, which includes a light source, a lens array, a condenser lens, and a wavelength conversion element. The light source is for providing a light beam. The lens array is disposed on a transmission path of the light beam. The lens array includes a plurality of lenses. Each of the lenses has a first surface and a second surface opposite to each other. Each of the first surfaces is adjacent to the light source. Each of the first surfaces or each of the second surfaces is an aspherical surface. The condenser lens is disposed on the transmission path of the light beam and for receiving the light beam passing through the lens array and converting the light beam into a condenser light beam. The wavelength conversion element is for receiving the condenser light beam and converting at least a portion of the condenser light beam into a converted light beam.

In the illumination system of the projection device of the embodiment of the invention, through the setting of the lens array, each of the first surfaces or each of the second surfaces of each of the lenses of the lens array is an aspherical surface, by which the conversion efficiency of the phosphor layer is effectively improved and the phosphor layer is prevented from damage.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
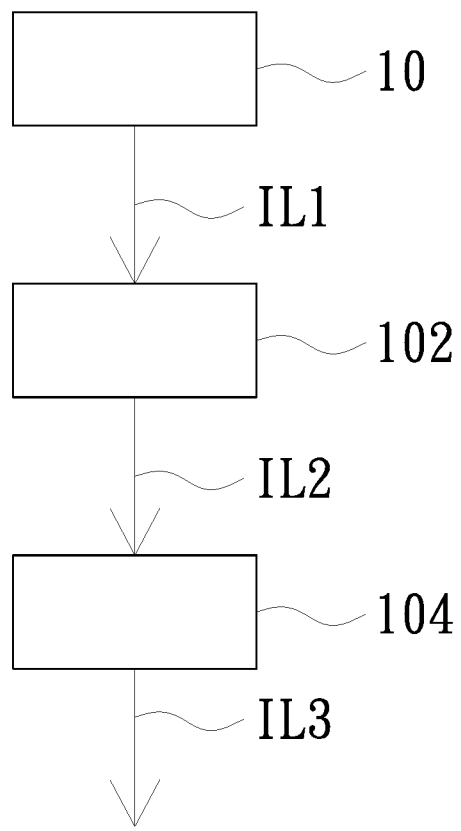
FIG. 1 is a schematic block diagram of a projection device according to an embodiment of the invention.

FIG. 1 is a schematic diagram of a projection device according to an embodiment of the invention. Referring to FIG. 1, the projection device 1 of this embodiment includes an illumination system 10, a light valve 102, and a projection lens 104. The light valve 102 is disposed on the transmission path of an illumination light beam IL1 provided by the illumination system 10 and is for converting the illumination light beam IL1 into an image light beam IL2. The projection lens 104 is disposed on the transmission path of the image light beam IL2. The image light beam IL2 is converted into the projection light beam IL3 after passing through the projection lens 104 to form an image on the projection screen. FIG. 1 takes one light valve 102 as an example; however, in other embodiments, the number of the light valves 102 may also be multiple. In addition, the light valve 102 of the embodiment takes a transmissive light valve (for example, a transmissive liquid crystal panel) as an example; however, the invention is not limited thereto. In other embodiments, the light valve 102 can also be a reflective light valve, such as a reflective liquid crystal panel, a DMD (digital micro-mirror device), or a LCoS (liquid crystal on silicon) panel, and the type of matching optical components and placement position can be adjusted appropriately.

Figure 2:
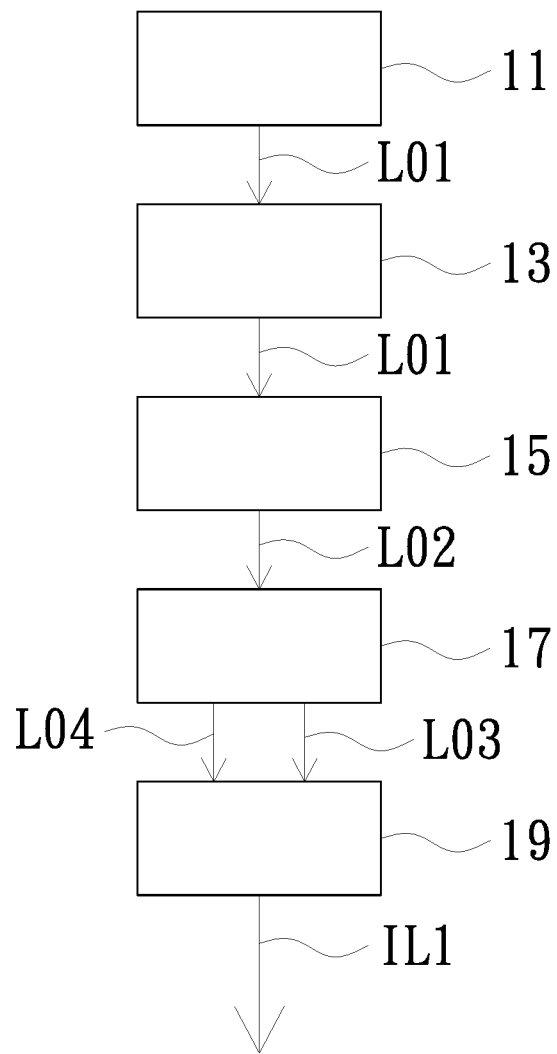
FIG. 2 is a schematic block diagram of an illumination system according to an embodiment of the invention.

FIG. 2 is a schematic block diagram of an illumination system according to an embodiment of the invention. Referring to FIG. 2, in the embodiment, the illumination system 10 includes a light source 11, a lens array 13, a condenser lens 15, a wavelength conversion element 17, and a light integration rod 19. In this embodiment, the light source 11 is for providing a light beam L01. The light source 11 is, for example, a laser diode (LD) or a blue laser diode bank. Alternatively, the light source 11 may also be a light emitting diode (LED) or an organic light-emitting diode (OLED). Specifically, the light source qualified by the actual design requirements can be implemented, and the invention is not limited thereto. The lens array 13 is disposed on the transmission path of the light beam L01. The condenser lens 15 is disposed on the transmission path of the light beam L01, and for receiving the light beam L01 passing through the lens array 13 and converting the light beam L01 into a condenser light beam L02. The wavelength conversion element 17 is for receiving the condenser light beam L02 and converting a first portion of the condenser light beam L02 into a converted light beam L03. The converted light beam L03 from the wavelength conversion element 17 and a second portion L04 of the condenser light beam L02 are transmitted to the light integration rod 19. The converted light beam L03 and the second portion L04 of the condenser light beam L02 are homogenized by the light integration rod 19 to form the illumination light beam IL1. In another embodiment, since the illumination system of the invention has the lens array 13 to homogenize the light beam, the light integration rod 19 may not be provided. That is, the converted light beam L03 from the wavelength conversion element 17 and the second portion L04 of the condenser light beam L02 directly form the illumination light beam IL1.

Figure 3:
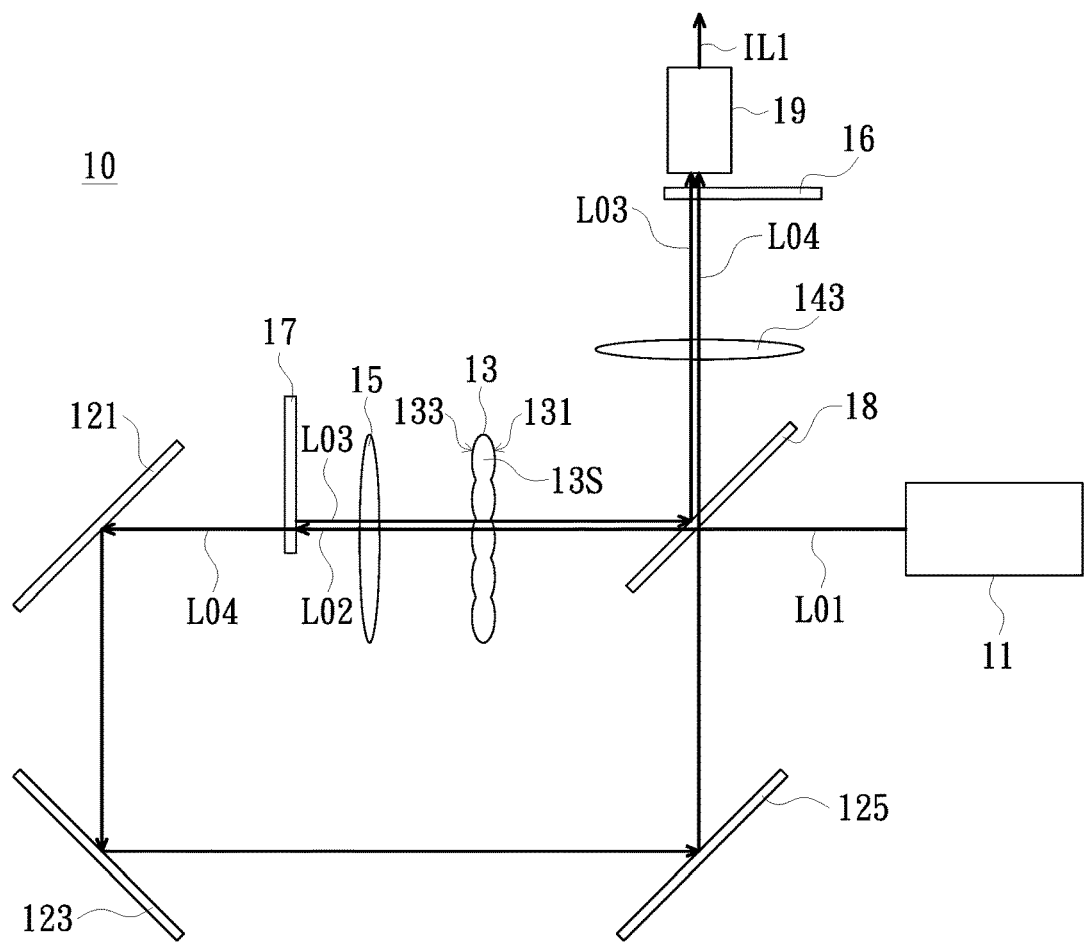
FIG. 3 is a schematic diagram of an illumination system according to an embodiment of the invention.

FIG. 3 is a schematic diagram of the illumination system shown in FIG. 2 according to an embodiment of the invention. Referring to FIG. 3, the illumination system 10 of this embodiment includes a light source 11, a lens array 13, a condenser lens 15, a wavelength conversion element 17, and a light integration rod 19. The light source 11 is for providing a light beam (exciting light beam, for example) L01. The lens array 13 is disposed on the transmission path of the light beam L01. The lens array 13 includes a plurality of lenses 13S, and each of the lenses 13S has a first surface 131 and a second surface 133 opposite to each other. Each of the first surfaces 131 is adjacent to the light source 11. Each of the first surfaces 131 or each of the second surfaces 133 is an aspherical surface. The condenser lens 15 is disposed on the transmission path of the light beam L01, and for receiving the light beam L01 passing through the lens array 13 and converting the light beam L01 into a condenser light beam L02. The wavelength conversion element 17 is for receiving the condenser light beam L02 and converting a first portion of the condenser light beam L02 into the converted light beam L03. The light integration rod 19 is disposed on the transmission path of the converted light beam L03. Through the aspherical surface design of each of the first surfaces 131 or each of the second surfaces 133 of each of the lenses 13S, the energy density (unit area) of the central region of the condenser light beam L02 can be made lower than the energy density (unit area) of the peripheral region of the condenser light beam L02 (the region other than the central region of a section of the wavelength conversion element 17 on which the condenser light beam L02 irradiates, for example). That is, the energy (every single point) of the central region of the condenser light beam L02 is lower than the highest energy of the condenser light beam L02, or the energy of the central region of the condenser light beam L02 is lower than the average energy of the condenser light beam L02. As such, the high thermal energy accumulation of the condenser light beam L02 irradiating on the wavelength conversion element 17 can be reduced, and accordingly the conversion efficiency of the wavelength conversion element 17 is effectively improved and the wavelength conversion element 17 is prevented from damage. The specific operation details will be described in detail in FIGS. 7a to 11f.

In this embodiment, the illumination system 10 further includes a dichroic element 18. The dichroic element 18 is disposed between the light source 11 and the lens array 13, and for allowing the light beam L01 from the light source 11 to pass therethrough to the lens array 13. The lens array 13 projects the light beam L01 to the condenser lens 15. The condenser lens 15 converts the light beam L01 into the condenser light beam L02 and converges the condenser light beam L02 to the wavelength conversion element 17.

Figure 4:
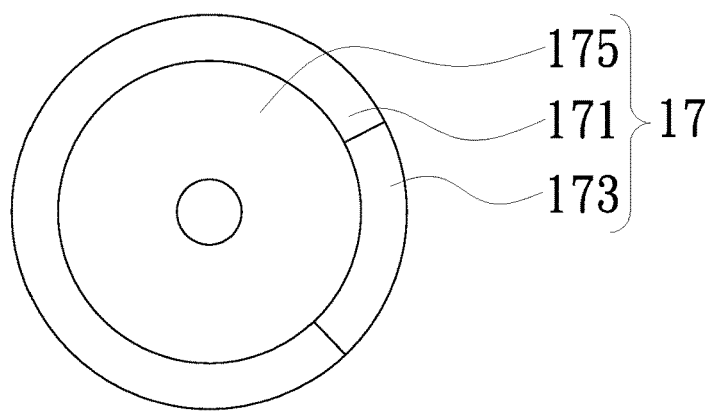
FIG. 4 is a schematic diagram of the wavelength conversion element of FIG. 3.

Please refer to FIGS. 3 and 4 at the same time. FIG. 4 is a schematic diagram of the wavelength conversion element 17 shown in FIG. 3. The wavelength conversion element 17 has a reflective wavelength conversion portion 171 and a translucent portion 173. The reflective wavelength conversion portion 171 of the wavelength conversion element 17 is for converting the first portion of the condenser light beam L02 into a converted light beam L03 and for reflecting the converted light beam L03 to the dichroic element 18. The translucent portion 173 of the wavelength conversion element 17 is for being passed through by a second portion L04 of the condenser light beam L02 from the condenser lens 15. The dichroic element 18 is for reflecting the converted light beam L03 from the wavelength conversion element 17, so as to project the converted light beam L03 to the light integration rod 19.

Specifically, as shown in FIG. 3, the wavelength conversion element 17 is, for example, a phosphor wheel, and includes a turntable 175 and a motor (not shown) that drives the turntable 175 to rotate. In this embodiment, the reflective wavelength conversion portion 171 is disposed on the turntable 175. The turntable 175 has the translucent portion 173. The translucent portion 173 is, for example, an opening or a transparent diffusing element disposed on the turntable 175, but the invention is not limited thereto. In this embodiment, the reflective wavelength conversion portion 171 has a phosphor, and the phosphor is, for example, a yellow phosphor that can excite a yellow converted light beam, but the invention is not limited thereto. In other embodiments, the reflective wavelength conversion portion 171 may also have a plurality of regions to be respectively disposed with a plurality of phosphors, such as a yellow phosphor that excites a yellow converted light beam and a green phosphor that excites a green converted light beam. In this embodiment, since the reflective wavelength conversion portion 171 and the translucent portion 173 form an annular arrangement, the condenser light beam L02 can take turn to irradiate on the reflective wavelength conversion portion 171 and the translucent portion 173 as the turntable 175 rotates. Herein it is defined that the first portion of the condenser light beam L02 refers to a light beam that is irradiated on the reflective wavelength conversion portion 171, and the second portion L04 of the condenser light beam L02 refers to a light beam that is irradiated on the translucent portion 173. More specifically, in this embodiment, when the reflective wavelength conversion portion 171 is rotated to the transmission path of the condenser light beam L02, the condenser light beam L02 at this time is the first portion thereof, which is converted into a converted light beam L03 by the reflective wavelength conversion portion 171. On the other hand, in this embodiment, when the translucent portion 173 is rotated to the transmission path of the condenser light beam L02, the condenser light beam L02 irradiated to the translucent portion 173 at this time is the second portion L04 thereof, which passes through the translucent portion 173. In other words, "the first portion of the condenser light beams" and "the second portion of the condenser light beams" in the invention do not mean that the condenser light beam L02 includes two kinds of light beams or includes two light beams, but means that the same condenser light beam L02 from the light source 11 irradiates at different times on the wavelength conversion element 17 respectively. For example, the condenser light beam L02 irradiates at the reflective wavelength conversion portion 171 and the translucent portion 173 at different times respectively. For convenience of explaining that the condenser light beam L02 at different times irradiates at different portions of the wavelength conversion element 17, it is referred to as "the first portion of the condenser light beam L02" and "the second portion L04 of the condenser light beam L02". In short, the first portion of the condenser light beam L02 refers to the condenser light beam that irradiates at the reflective wavelength conversion portion 171. The condenser light beam L02 passes through the translucent portion 173 when the translucent portion 173 is rotated to the transmission path of the condenser light beam L02, and therefore, the second portion L04 of the condenser light beam L02 refers to the condenser light beam that has passed through the translucent portion 173.

In detail, please refer to FIG. 3. The illumination system 10 may further include an optical transmission module. The optical transmission module may include, for example, a first reflective element 121, a second reflective element 123, and a third reflective element 125. The optical transmission module is disposed on a transmission path of the second portion L04 of the condenser light beam L02 passing through the translucent portion 173, and is for transmitting the second part L04 of the condenser light beam L02 passing through the translucent portion 173 of the wavelength conversion element 17 back to the dichroic element 18. The dichroic element 18 allows the second part L04 of the condenser light beam L02 to pass therethrough and project onto the light integration rod 19. Specifically, the first reflective element 121 is disposed on the transmission path of the second portion L04 of the condenser light beam L02, and is for reflecting the second portion L04 of the condenser light beam L02 passing through the translucent portion 173 to the second reflective element 123. The second reflective element 123 is for reflecting the second portion L04 of the condenser light beam L02 to the third reflective element 125. The third reflective element 125 is for reflecting the second portion L04 of the condenser light beam L02 to the dichroic element 18. The optical transmission module shown in FIG. 3 is only an example, and is not intended to limit the invention thereto.

Therefore, in this embodiment, through the arrangement of the dichroic element 18 and the optical transmission module, the second portion L04 of the condenser light beam L02 and the converted light beam L03 can be transmitted to the light integration rod 19 to form the illumination light beam ILL The light valve 102 receives the illumination light beam IL1 delivered from the light integration rod 19 and converts the illumination light beam IL1 into the image light beam IL2 when the illumination system 10 is applied to the projection device 1 as shown in FIG. 1.

Please refer to FIGS. 3 and 4. In this embodiment, the reflective wavelength conversion portion 171 is for converting the first portion of the corresponding condenser light beam L02 into a converted light beam L03, and to reflect the converted light beam L03. The translucent portion 173 is for allowing the second portion L04 of the condenser light beams L02 to pass therethrough. In this embodiment, when the motor drives the turntable 175 to rotate, the condenser light beams L02 provided by the light source 11 can take turn to irradiate on the reflective wavelength conversion portion 171 and the translucent portion 173. The reflective wavelength conversion portion 171 causes the condenser light beams L02 to excite the phosphor to generate a converted light beam L03 and reflect the converted beam L03. The translucent portion 173 can be passed through by the second portion L04 of the condenser light beams L02. Specifically, in this embodiment, the reflective wavelength conversion portion 171 may further be provided with a reflective layer or a reflective coating layer (not shown). The phosphor is disposed on the reflective layer or the reflective coating layer for reflecting the light generated by the phosphor, so that the efficiency of reflecting the converted light beam L03 is enhanced, but the invention is not limited thereto. The condenser light beam L02 of this embodiment is, for example, a blue light beam. The converted light beam L03 is, for example, a yellow light beam, but the invention is not limited thereto. In an embodiment, the blue light beam is, for example, a light beam of 420-470 nanometers (nm), but the invention is not limited thereto.

Incidentally, the illumination system 10 may further include a lens 143. The lens 143 is disposed on the light path of the converted light beam L03 between the light integration rod 19 and the wavelength conversion element 17, and allows the converted light beam L03 reflected by the wavelength conversion element 17 to be projected to the light integration rod 19 via the lens 143. In this embodiment, the lens 143 is disposed between the light integration rod 19 and the dichroic element 18 as an example, but the invention is not limited thereto. Through the setting of lens 143, the converted light beam L03 and the second portion L04 of the condenser light beam L02 can be more effectively projected into the light integration rod 19.

In addition, in this embodiment, the illumination system 10 may further include, for example, a color wheel 16, wherein the color wheel 16 is disposed between the light integration rod 19 and the dichroic element 18. In this embodiment, the color wheel 16 is, for example, a filter wheel for filtering the light beam, so that the light beams of different colors passing through the color wheel 16 are more purely colored. In this embodiment, the converted light beam L03 from the dichroic element 18 and the second portion L04 of the condenser light beam L02 are filtered by the color wheel 16 and then uniformized by the light integration rod 19 to generate the illumination light beam ILL In this embodiment, the light integration rod 19 may be, for example, a hollow light integration rod or a solid light integration rod, but the invention is not limited thereto.

In this embodiment, the dichroic element 18 may be a dichroic unit (for example, a dichroic mirror) or a semi-transflective element (for example, a half mirror) depending on the color of the light beam L01 and the converted light beam L03.

In one embodiment, the optical element such as the dichroic element or lens may be formed by a spherical lens, an aspherical lens, or a coating, etc. as needed, but the invention is not limited thereto.

Figure 5:
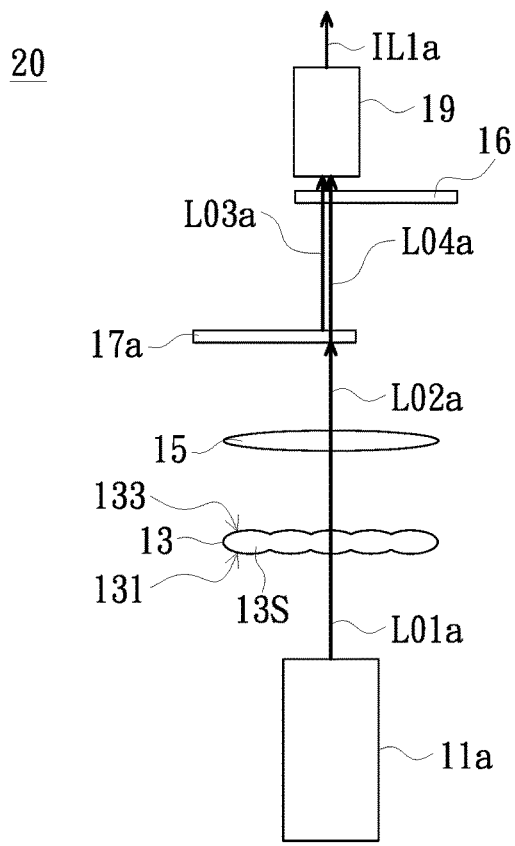
FIG. 5 is a schematic diagram of an illumination system according to another embodiment of the invention.

FIG. 5 is a view of an illumination system according to another embodiment of the invention. Please refer to FIG. 5. The illumination system 20 of this embodiment includes a light source 11a, a lens array 13, a condenser lens 15, a wavelength conversion element 17a, and a light integration rod 19. The light source 11a is for providing a light beam L01a. The condenser lens 15 is disposed on the transmission path of the light beam L01a for receiving the light beam L01a passing through the lens array 13 and converting the light beam L01a into a condenser light beam L02a. The wavelength conversion element 17a is disposed on the transmission path of the condenser light beam L02a for converting a first portion of the condenser light beam L02a into a converted light beam L03a. The light integration rod 19 is disposed on the transmission path of the converted light beam L03a for receiving the converted light beam L03a and the second portion L04a of the condenser light beam L02a from the wavelength conversion element 17a. By the aspherical surface design of each of the first surfaces 131 or each of the second surfaces 133 of each of the lenses 13S of the lens array 13, the energy density (unit area) of the central region of the condenser light beam L02a can be made lower than the energy density (unit area) of the peripheral region. That is, the energy of the central region of the condenser light beam L02a is lower than the highest energy of the condenser light beam L02a, and accordingly the conversion efficiency of the wavelength conversion element 17a is effectively improved and the wavelength conversion element 17a is prevented from damage. The specific operation details will be described in detail in FIGS. 7a to 11f.

Figure 6:
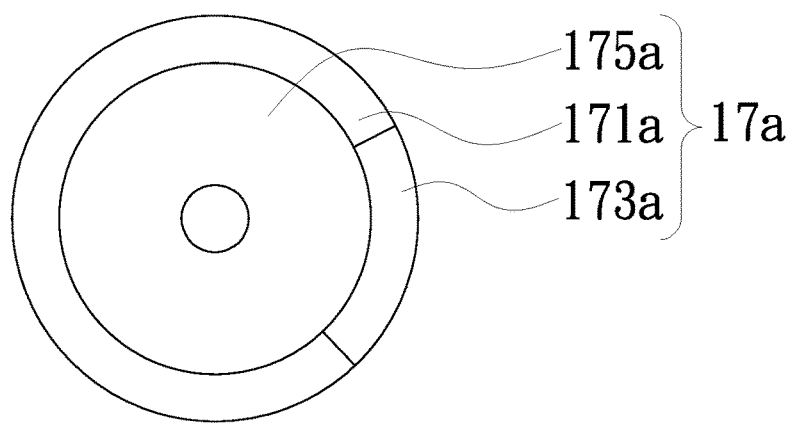
FIG. 6 is a schematic diagram of the wavelength conversion element of FIG. 5.
Figure 7:
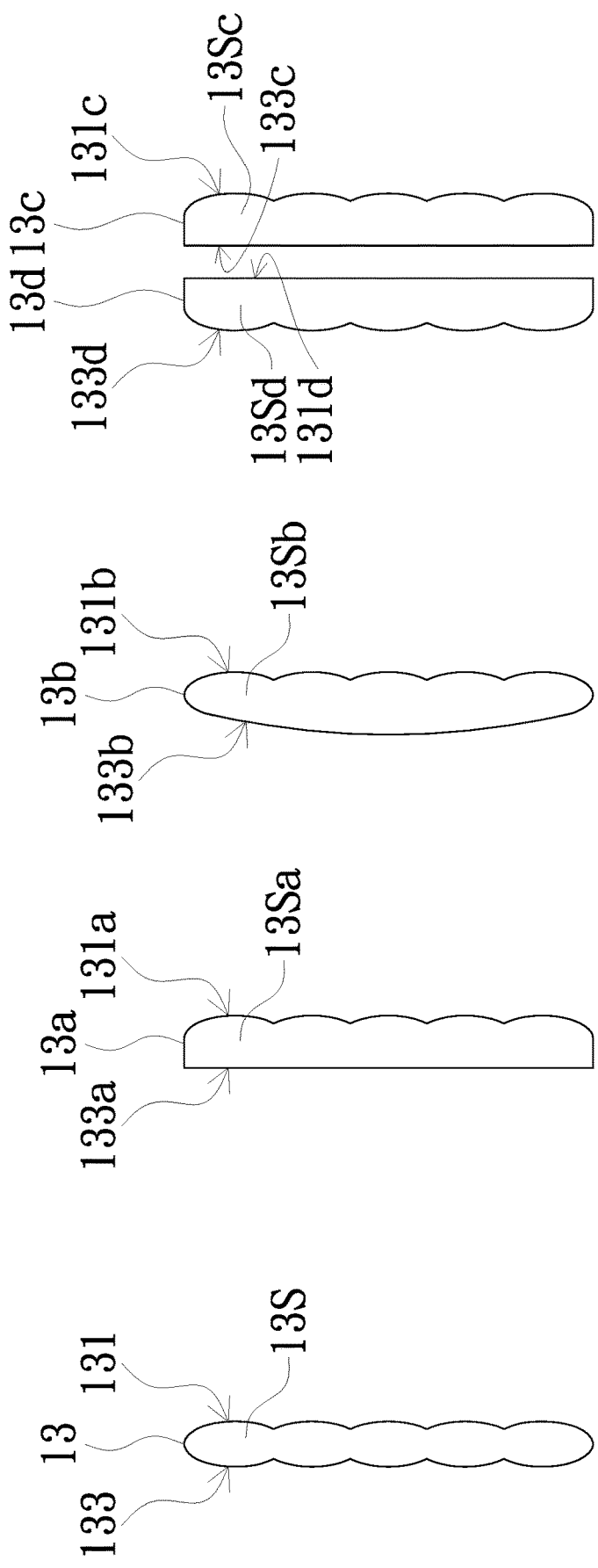
FIGS. 7a to 7d are side views of the lens array of the embodiment of the invention.

FIG. 6 is a schematic diagram of the wavelength conversion element 17a of FIG. 5. As shown in FIG. 6, in this embodiment, the difference from the FIG. 4 embodiment is that the wavelength conversion element 17a of the illumination system 20 has a transmissive wavelength conversion portion 171a and a translucent portion 173a. The transmissive wavelength conversion portion 171a of the wavelength conversion element 17a is for converting the first portion of the condenser light beam L02a into a converted light beam L03a, and allows the converted light beam L03a to pass therethrough and be transmitted to the light integration rod 19.

In detail, in this embodiment, the wavelength conversion element 17a is, for example, a phosphor wheel, and includes a turntable 175a and a motor that drives the turntable 175a to rotate (not shown). In this embodiment, the transmissive wavelength conversion portion 171a is disposed on the turntable 175a and includes a phosphor, for example, a yellow phosphor that can excite a yellow converted light beam, but the invention is not limited thereto. In other embodiments, the transmissive wavelength conversion portion 171a may also have multiple regions to respectively dispose a plurality of different colors of phosphor. The turntable 175a may have the above transmissive wavelength conversion portion 171a for converting the first portion of the condenser light beam L02a into the converted light beam L03a and for allowing the converted light beam L03a to pass through and transmit to the light integration rod 19; the translucent portion 173a allows the second portion L04a of the condenser light beam L02a to pass through and transmit to the light integration rod 19. In this embodiment, the condenser light beam L02a provided by the light source 11a can take turn to irradiate on the transmissive wavelength conversion portion 171a and the translucent portion 173a to excite the first portion of the condenser light beam L02a when the motor drives the turntable 175a to rotate. The phosphor generates a converted light beam L03a, the converted light beam L03a passes through the transmissive wavelength conversion portion 171a, and the second portion L04a of the condenser light beam L02a passes through the translucent portion 173a. The condenser light beam L02a of this embodiment is, for example, a blue light beam, and the converted light beam L03a is, for example, a yellow light beam, but the embodiment is not limited thereto.

In addition, the illumination system 20 may further include a color wheel 16 disposed between the light integration rod 19 and the wavelength conversion element 17a. The converted light beam L03a and the second portion L04a of the condenser light beam L02a are filtered by the color wheel 16 and then uniformized by the light integration rod 19 to generate an illumination light beam IL1a. In addition, a lens (not shown) may be disposed on the light path between the wavelength conversion element 17a and the light integration rod 19, so that the converted light beam L03a and the second portion L04a of the condenser light beam L02a can be projected into the light integration rod 19 more efficiently.

Please refer to FIGS. 7a to 7d, wherein FIG. 7a is a side view of the lens array 13 of the illustrated embodiment of the invention, FIGS. 7b to 7d are schematic diagrams of other possible forms of the lens array of the illustrated embodiment of the invention. The lens array of the illumination system 10 or 20 of the invention includes a plurality of lenses. Each of the lenses has a first surface and a second surface opposite to each other. Each of the first surfaces or each of the second surfaces is an aspherical surface. Through the design in which each of the first surfaces or each of the second surfaces of each of the lenses is an aspherical surface, the energy of the central region of the condenser light beams can be lower than the highest energy of the condenser light beams, or the energy of the central region of the condenser light beams can be lower than the average of the condenser light beams, and accordingly the conversion efficiency of the phosphor layer is effectively improved and the phosphor layer is prevented from damage.

As shown in FIG. 7a, in the illumination system 10 or 20 of the embodiment shown in FIG. 3 or 5, each of the first surfaces 131 and each of the second surfaces 133 of each of the lenses 13S of the lens array 13 are aspherical surfaces, but the invention is not limited thereto.

In addition, the lens array 13 in the illumination system 10 or 20 of the embodiment shown in FIG. 3 or 5 can be replaced with the lens array 13a as shown in FIG. 7b. The lens array 13a includes a plurality of lenses 13Sa, and each of the lenses 13Sa has a first surface 131a and a second surface 133a opposite to each other. In this embodiment, each of the first surfaces 131a of each of the lenses 13Sa is an aspherical surface, and each of the second surfaces 133a is a flat surface.

In addition, the lens array 13 in the illumination system 10 or 20 of the embodiment shown in FIG. 3 or 5 can be replaced with the lens array 13b as shown in FIG. 7c. The lens array 13b includes a plurality of lenses 13Sb, and each of the lenses 13Sb has a first surface 131b and a second surface 133b opposite to each other. In this embodiment, each of the first surfaces 131b of each of the lenses 13Sb is an aspherical surface, while the second surfaces 133b of the lenses 13Sb form a spherical or an aspherical surface.

In addition, the lens array 13 in the illumination system 10 or 20 of the embodiment shown in FIG. 3 or 5 can be replaced with a combination of the lens array 13c and the secondary lens array 13d as shown in FIG. 7d. The secondary lens array 13d is disposed between the condenser lens 15 and the lens array 13c. The lens array 13c includes a plurality of lenses 13Sc, the secondary lens array 13d includes a plurality of secondary lenses 13Sd, and each of the secondary lenses 13Sd is disposed corresponding to each of the lenses 13Sc of the lens array 13c. Each of the lenses 13Sc of the lens array 13c has a first surface 131c and a second surface 133c opposite to each other. Each of the secondary lenses 13Sd has a third surface 131d and a fourth surface 133d, and the third surface 131d is adjacent to the lens array 13c. In this embodiment, each of the third surfaces 131d or each of the fourth surfaces 133d is an aspherical surface.

In detail, in the embodiment of FIG. 7d, each of the first surfaces 131c of each of the lenses 13Sc of the lens array 13c may be an aspherical surface, and each of the second surfaces 133c may be a flat surface. Each of the third surfaces 131d of each of the secondary lenses 13Sd of the secondary lens array 13d may be a flat surface, and each of the fourth surfaces 133d is an aspherical surface. However, the invention is not limited thereto.

The lens array 13, 13a, 13b, 13c or the secondary lens array 13d of the embodiment shown in FIGS. 7a to 7d are only an example and are not intended to limit the invention. It is within the scope of the invention as long as each of the first surfaces or each of the second surfaces of the lens array is an aspherical surface.

Figure 8:
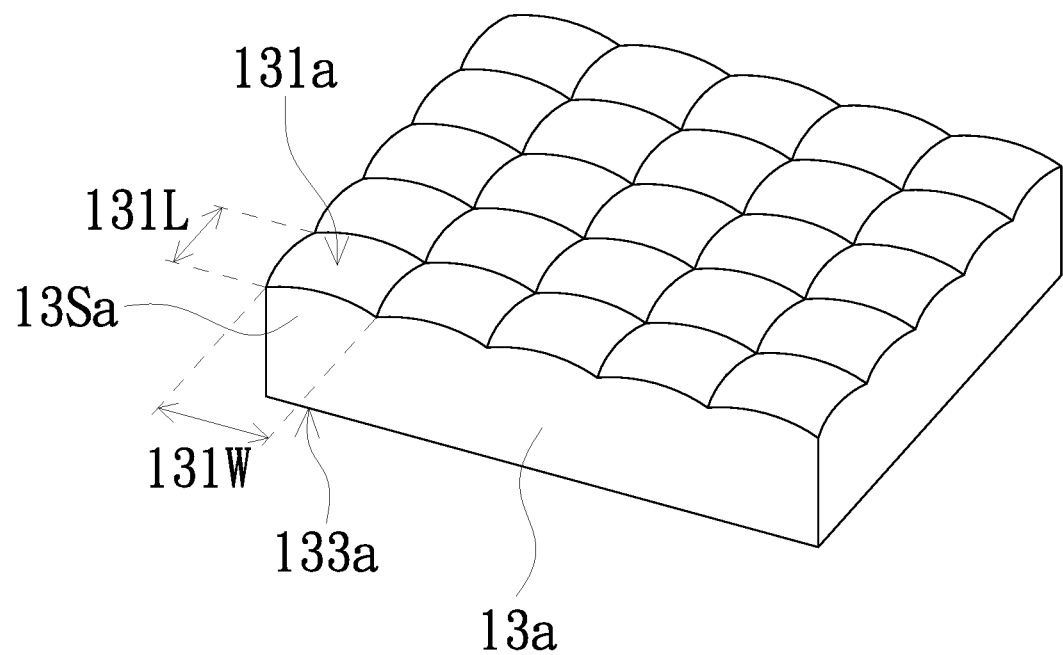
FIG. 8 is a perspective view of the lens array shown in FIG. 7b.

Please refer to FIG. 8. FIG. 8 is a perspective schematic view of the lens array 13a shown in FIG. 7b. The outer edge contour (orthographic projection, for example) of each of the first surfaces 131a of each of the lenses 13Sa includes a length 131L and a width 131W. The invention is only illustrated by a schematic diagram of the lens array 13a shown in FIG. 8, and the lens array 13, 13b, 13c or the secondary lens array 13d shown in FIGS. 7a, 7c and 7d may also have similar or identical structure to the lens array 13a, the details of which are not repeated here.

Figure 9A:
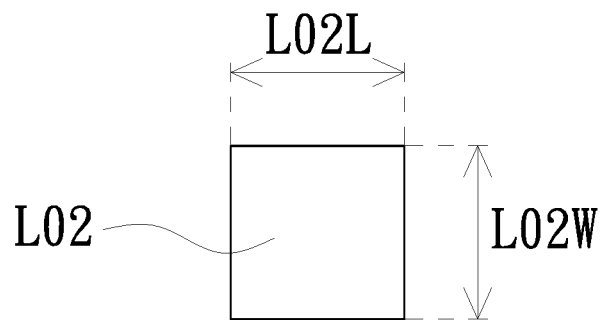
FIG. 9a is a cross-sectional view of the condenser light beams of the embodiment shown in FIG. 3.
Figure 9B:
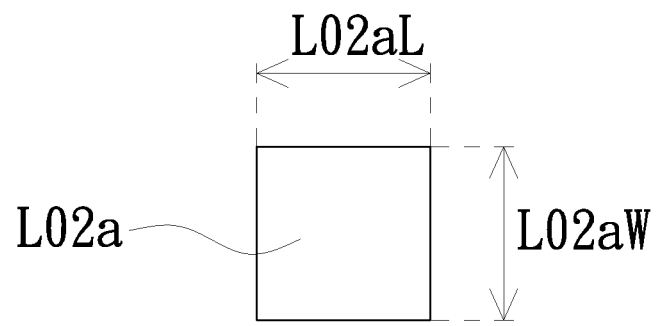
FIG. 9b is a cross-sectional view of the condenser light beams of the embodiment shown in FIG. 5.

Refer to FIGS. 9a and 9b. FIG. 9a is a cross-sectional view of the embodiment shown in FIG. 3 that the condenser light beam L02 of the illumination system 10 is irradiated on the wavelength conversion element 17. FIG. 9b is a cross-sectional view of the embodiment shown in FIG. 5 that the condenser light beam L02a of the illumination system 20 is irradiated on the wavelength conversion element 17a. As shown in FIG. 9a, when the illumination system 10 is set to the lens array 13a as shown in FIG. 8, since the outer edge contour of each of the first surfaces 131a of each of the lenses 13Sa of the lens array 13a includes the length 131L and the width 131W, therefore, after the light beam L01 that passes through the lens array 13a is condensed by the condenser lens 15, the outer edge contour of the section of the condenser light beam L02 irradiated on the wavelength conversion element 17 includes a length L02L and a width L02W. The aspect ratio (length L02L/width L02W) of the outer edge contour of the section of the condenser light beam L02 is the same as the aspect ratio (length 131L/width 131W) of the outer edge contour of the first surface 131a of the lens 13Sa. As shown in FIG. 9b, when the illumination system 20 is set to the lens array 13a as shown in FIG. 8, after the light beam L01a that passes through the lens array 13a is condensed by the condenser lens 15, the outer edge contour of the section of the condenser light beam L02a irradiated on the wavelength conversion element 17 includes a length L02aL and a width L02aW. The aspect ratio (length L02aL/width L02aW) of the outer edge contour of the section of the condenser light beam L02a is the same as the aspect ratio (length 131L/width 131W) of the outer edge contour of the first surface 131a of the lens 13Sa.

Incidentally, in an embodiment of the invention, the length and width of the cross section of the condenser light beam L02 or L02a has a first ratio (L02L/L02W or L02aL/L02aW); the length and width of the outer edge contour of the first surface 131a of the lens 13Sa has a second ratio (131L/131W); wherein the ratio of the first ratio to the second ratio ((L02L/L02W)/(131L/131W)) may be between 0.75 and 1.3, but the invention is not limited thereto.

Figure 10:
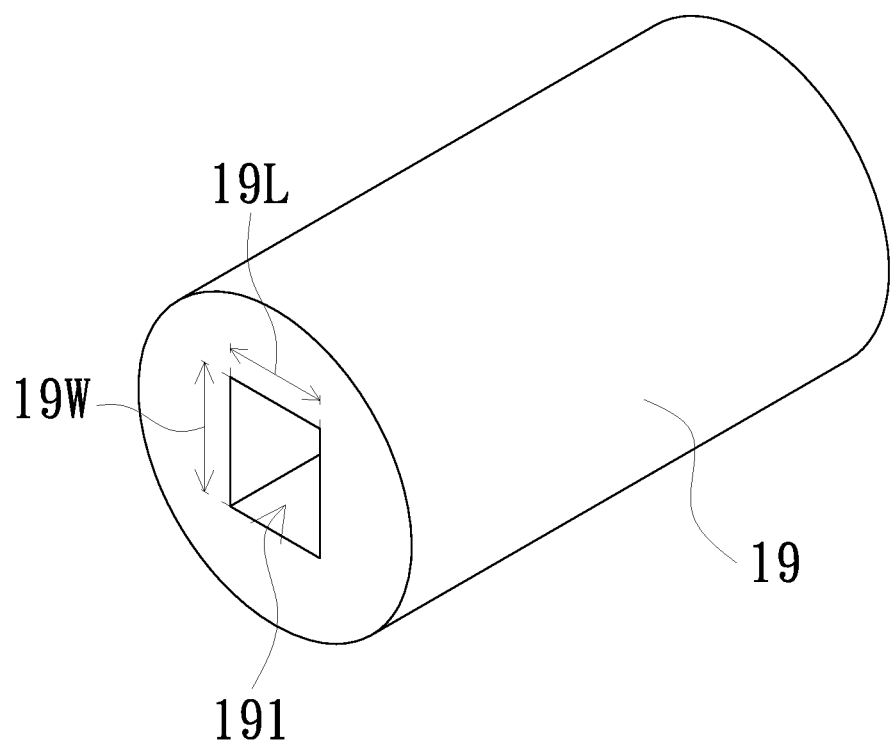
FIG. 10 is a perspective view of the light integration rod of the illustrated embodiment of the invention.
Figure 11A:
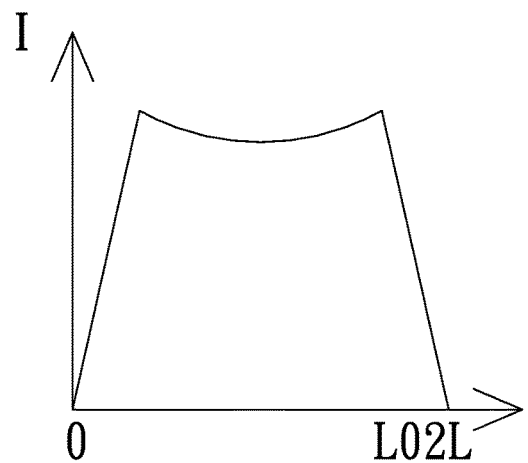
FIGS. 11a to 11f are schematic diagrams of one-dimensional energy intensity distribution of the cross section of the condenser light beams of the embodiment of the invention.
Figure 11B:
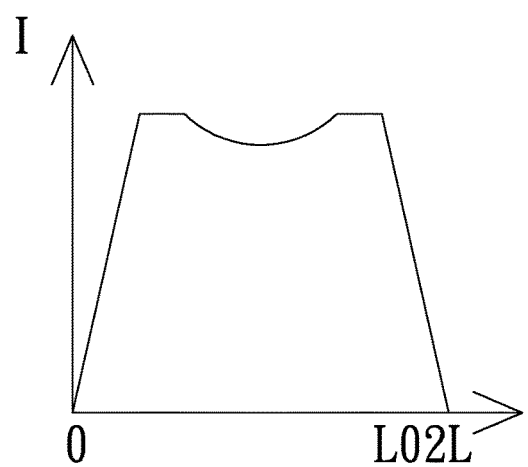
Figure 11C:
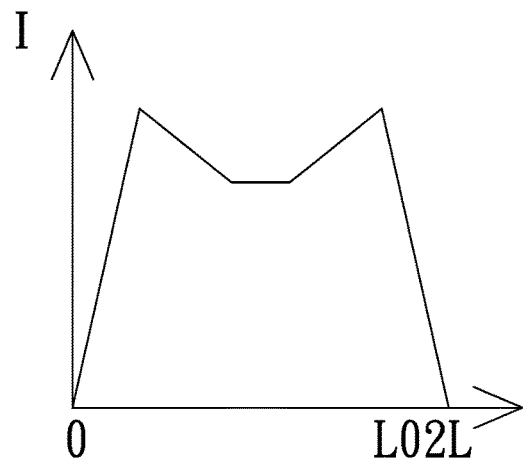
Figure 11D:
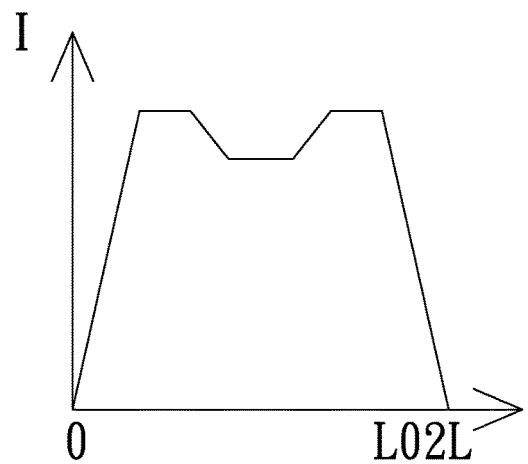
Figure 11E:
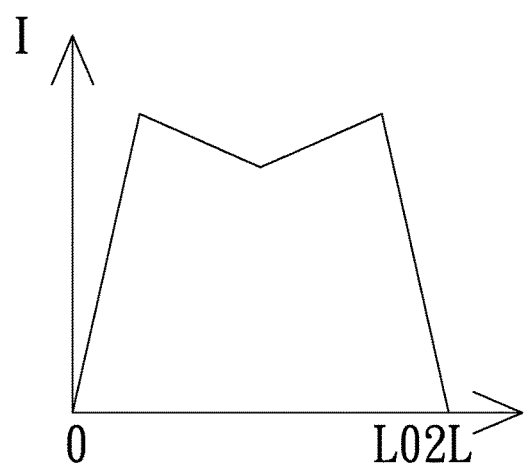
Figure 11F:
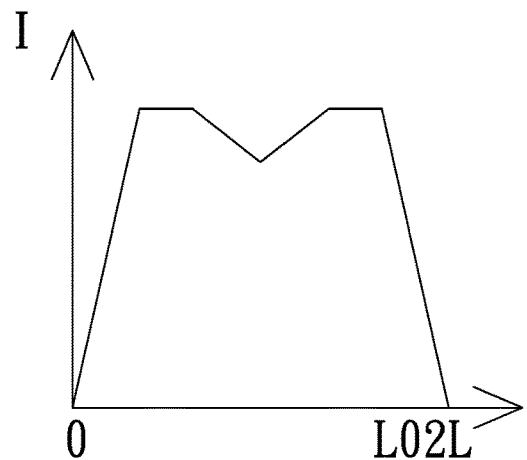

Please refer to FIG. 10. FIG. 10 is a perspective schematic view of the light integration rod 19 of the illumination system 10 or 20 of the illustrated embodiment of the invention. The light integration rod 19 includes an opening 191 for receiving the converted light beam L03 or L03a from the wavelength conversion element 17 or 17a. The opening 191 includes a length 19L and a width 19W. In the embodiment shown in FIG. 3, the aspect ratio of the outer edge contour of the section of the condenser light beam L02 may be the same as the aspect ratio of the opening 191 of the light integration rod 19; in the embodiment shown in FIG. 5, the aspect ratio of the outer edge contour of the section of the condenser light beam L02a may be the same as the aspect ratio of the opening 191 of the light integration rod 19; but the invention is not limited thereto. Through the design that the cross-sectional aspect ratio of the condenser light beam L02 and L02a is the same as the aspect ratio of the opening 191 of the light integration rod 19, the converted light beam L03 or L03a generated by the wavelength conversion element 17 or 17a can be effectively projected to the light integration rod 19.

Please refer to FIGS. 11a to 11f. FIGS. 11a to 11f are one-dimensional energy intensity schematic diagrams of the section of the condenser light beam L02 irradiated on the wavelength conversion element 17. The one-dimensional energy intensity schematic diagram refers to the one-dimensional light beam energy intensity distribution through the central region of the condenser light beam L02. In the invention, through the design that each of the first surfaces or each of the second surfaces of each of the lenses of the lens array is an aspherical surface, the angular distribution of the light beam exiting from the lens can be controlled. The energy density (unit area) of the central region of a section on which the condenser light beam L02 is irradiated on the wavelength conversion element 17 is lower than the energy density (unit area) of the peripheral region (not including the central region). That is, the average energy of the central region of the condenser light beam L02 is lower than the highest energy of the condenser light beam L02, or the average energy of the central region of the condenser light beam L02 is lower than the average energy of the condenser light beam L02, and accordingly the conversion efficiency of the wavelength conversion element is effectively improved and the wavelength conversion element is prevented from damage. In an embodiment, the average energy density of the central region of a section of the condenser light beam L02 irradiated on the wavelength conversion element 17 is not greater than 90% of the highest energy density of the section of the condenser light beam L02, but is not limited thereto. In another embodiment, the lowest energy density of the central region of a section of the condenser light beam L02 irradiated on the wavelength conversion element 17 is not greater than 95% or 90% of the highest energy density of the condenser light beam L02, but the invention is not limited thereto.

In the invention, the central region of the condenser light beam L02 refers to a region including a geometric center of a section on which the condenser light beam L02 is irradiated on the wavelength conversion element 17. The range and location of the region can be varied depending on the application. For example, the area of the central region accounts for 20% or 30% of the entire section, but is not limited thereto. The energy intensity distribution shown in FIGS. 11a to 11f is merely illustrative and is not intended to limit the present invention thereto.

In an embodiment of the invention, each of the lenses of the lens array includes an aspherical surface, for example, it may be in the form of circular symmetry, xy symmetry or free-form curve surface, but the invention is not limited thereto.

In the embodiment shown in FIG. 5, the condenser light beam L02a of the illumination system 20 irradiates on the wavelength conversion element 17, the cross-sectional energy intensity distribution may be similar or identical to the energy intensity distribution of the section of the condenser light beam L02, the details of which are not repeated here.

In summary, the illumination system of the projection device of the embodiment of the invention is configured by a lens array, and each of the first surfaces or each of the second surfaces of each of the lenses of the lens array is an aspherical surface, and accordingly the conversion efficiency of the wavelength conversion element is effectively improved and the wavelength conversion element is prevented from damage, and effectively project the converted light beam generated by the wavelength conversion element.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first surface, the second surface, the first reflective element and the second reflective element are only used for distinguishing various elements and do not limit the number of the elements.

What is claimed is:

1. A projection device, comprising an illumination system, a light valve, and a projection lens, wherein:
   the illumination system comprises a light source, a lens array, a condenser lens, and a wavelength conversion element, wherein:
      the light source is for providing a light beam;
      the lens array is disposed on a transmission path of the light beam, the lens array comprises a plurality of lenses, each of the lenses has a first surface and a second surface opposite to each other, each of the first surfaces is adjacent to the light source, and each of the first surface or each of the second surfaces is an aspherical surface;
      the condenser lens is disposed on the transmission path of the light beam and for receiving the light beam passing through the lens array and converting the light beam into a condenser light beam, wherein the energy of a central region of the condenser light beam is lower than the highest energy of the condenser light beam; and
      the wavelength conversion element is for receiving the condenser light beam and converting at least a portion of the condenser light beam into a converted light beam;
   the light valve is disposed on a transmission path of the converted light beam and for converting the converted light beam into an image light beam; and
   the projection lens is disposed on a transmission path of the image light beam.

2. The projection device according to claim 1, wherein each of the first surfaces and each of the second surfaces of each of the lenses are aspherical surfaces.

3. The projection device according to claim 1, wherein each of the first surfaces of each of the lenses is an aspherical surface, and each of the second surfaces of each of the lenses is a flat surface.

4. The projection device according to claim 1, wherein each of the first surfaces of each of the lenses is an aspherical surface, and each of the second surfaces of each of the lenses forms a spherical or an aspherical surface.

5. The projection device according to claim 1, wherein the illumination system further comprises a secondary lens array disposed between the condenser lens and the lens array, the secondary lens array comprises a plurality of secondary lenses, each of the secondary lenses is disposed corresponding to each of the lenses, each of the secondary lenses comprises a third surface and a fourth surface, the third surface is adjacent to the lens array, and each of the third surfaces or each of the fourth surfaces are aspherical surfaces.

6. The projection device according to claim 5, wherein each of the first surfaces of each of the lenses is an aspherical surface, each of the second surfaces is a flat surface, each of the third surfaces of each of the secondary lenses is a flat surface, and each of the fourth surfaces is an aspherical surface.

7. A projection device, comprising an illumination system, a light valve, and a projection lens, wherein:
   the illumination system comprises a light source, a lens array, a condenser lens, and a wavelength conversion element, wherein:
      the light source is for providing a light beam;
      the lens array is disposed on a transmission path of the light beam, the lens array comprises a plurality of lenses, each of the lenses has a first surface and a second surface opposite to each other, each of the first surfaces is adjacent to the light source, and each of the first surface or each of the second surfaces is an aspherical surface;
      the condenser lens is disposed on the transmission path of the light beam and for receiving the light beam passing through the lens array and converting the light beam into a condenser light beam; and
      the wavelength conversion element is for receiving the condenser light beam and converting at least a portion of the condenser light beam into a converted light beam;
   the light valve is disposed on a transmission path of the converted light beam and for converting the converted light beam into an image light beam; and
   the projection lens is disposed on a transmission path of the image light beam,
   wherein the illumination system further comprises a light integration rod disposed on a transmission path of the converted light beam and for receiving the converted light beam from the wavelength conversion element and transmitting the converted light beam to the light valve, wherein an aspect ratio of the condenser light beam is the same as an aspect ratio of an opening of the light integration rod.

8. A projection device, comprising an illumination system, a light valve, and a projection lens, wherein:
   the illumination system comprises a light source, a lens array, a condenser lens, and a wavelength conversion element, wherein:
      the light source is for providing a light beam;
      the lens array is disposed on a transmission path of the light beam, the lens array comprises a plurality of lenses, each of the lenses has a first surface and a second surface opposite to each other, each of the first surfaces is adjacent to the light source, and each of the first surface or each of the second surfaces is an aspherical surface;

the condenser lens is disposed on the transmission path of the light beam and for receiving the light beam passing through the lens array and converting the light beam into a condenser light beam; and the wavelength conversion element is for receiving the condenser light beam and converting at least a portion of the condenser light beam into a converted light beam;

the light valve is disposed on a transmission path of the converted light beam and for converting the converted light beam into an image light beam; and the projection lens is disposed on a transmission path of the image light beam, wherein a length and a width of the condenser light beam have a first ratio, and a length and a width of an outer edge contour of the first surface have a second ratio, wherein a ratio of the first ratio to the second ratio is between 0.75 and 1.3.

9. An illumination system, comprising a light source, a lens array, a condenser lens, and a wavelength conversion element, wherein:

the light source is for providing a light beam;

the lens array is disposed on a transmission path of the light beam, the lens array comprises a plurality of lenses, each of the lenses has a first surface and a second surface opposite to each other, each of the first surfaces is adjacent to the light source, and each of the first surfaces or each of the second surfaces is an aspherical surface;

the condenser lens is disposed on the transmission path of the light beam and for receiving the light beam passing through the lens array and converting the light beam into a condenser light beam, wherein the energy of a central region of the condenser light beam is lower than the highest energy of the condenser light beam; and the wavelength conversion element is for receiving the condenser light beam and converting at least a portion of the condenser light beam into a converted light beam.

10. The illumination system according to claim 9, wherein each of the first surfaces and each of the second surfaces of each of the lenses are aspherical surfaces.

11. The illumination system according to claim 9, wherein each of the first surfaces of each of the lenses is an aspherical surface, and each of the second surfaces of each of the lenses is a flat surface.

12. The illumination system according to claim 9, wherein each of the first surfaces of each of the lenses is an aspherical surface, and each of the second surfaces of each of the lenses forms a spherical or an aspherical surface.

13. The illumination system according to claim 9, further comprising a secondary lens array disposed between the condenser lens and the lens array, wherein the secondary lens array comprises a plurality of secondary lenses, each of the secondary lenses is disposed corresponding to each of the lenses, each of the secondary lenses comprises a third surface and a fourth surface, the third surface is adjacent to the lens array, and each of the third surfaces or each of the fourth surfaces are aspherical surfaces.

14. The illumination system according to claim 13, wherein each of the first surfaces of each of the lenses is an aspherical surface, each of the second surfaces is a flat surface, each of the third surfaces of each of the secondary lenses is a flat surface, and each of the fourth surfaces is an aspherical surface.

15. An illumination system, comprising a light source, a lens array, a condenser lens, and a wavelength conversion element, wherein:

the light source is for providing a light beam;

the lens array is disposed on a transmission path of the light beam, the lens array comprises a plurality of lenses, each of the lenses has a first surface and a second surface opposite to each other, each of the first surfaces is adjacent to the light source, and each of the first surfaces or each of the second surfaces is an aspherical surface;

the condenser lens is disposed on the transmission path of the light beam and for receiving the light beam passing through the lens array and converting the light beam into a condenser light beam; and the wavelength conversion element is for receiving the condenser light beam and converting at least a portion of the condenser light beam into a converted light beam, wherein the illumination system further comprises a light integration rod disposed on a transmission path of the converted light beam and for receiving the converted light beam from the wavelength conversion element and transmitting the converted light beam to the light valve, wherein an aspect ratio of the condenser light beam is the same as an aspect ratio of an opening of the light integration rod.

16. An illumination system, comprising a light source, a lens array, a condenser lens, and a wavelength conversion element, wherein:

the light source is for providing a light beam;

the lens array is disposed on a transmission path of the light beam, the lens array comprises a plurality of lenses, each of the lenses has a first surface and a second surface opposite to each other, each of the first surfaces is adjacent to the light source, and each of the first surfaces or each of the second surfaces is an aspherical surface;

the condenser lens is disposed on the transmission path of the light beam and for receiving the light beam passing through the lens array and converting the light beam into a condenser light beam; and the wavelength conversion element is for receiving the condenser light beam and converting at least a portion of the condenser light beam into a converted light beam, wherein a length and a width of the condenser light beam have a first ratio, and a length and a width of an outer edge contour of the first surface have a second ratio, wherein a ratio of the first ratio to the second ratio is between 0.75 and 1.3.

* * * * *